(12) United States Patent
Heinz et al.

(10) Patent No.: US 12,531,194 B2
(45) Date of Patent: Jan. 20, 2026

(54) HIGH-VOLTAGE DEVICE AND METHOD FOR INCREASING THE DIELECTRIC STRENGTH IN THE HIGH-VOLTAGE DEVICE

(71) Applicant: Siemens Energy Global GmbH & Co. KG, Munich (DE)

(72) Inventors: Thomas Heinz, Berlin (DE); Dietmar Frank, Berlin (DE); Armin Grund, Berlin (DE); Alexander Hartung, Berlin (DE); Martin Krehnke, Berlin (DE); Volker Lehmann, Treuenbrietzen (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 356 days.

(21) Appl. No.: 18/029,445

(22) PCT Filed: Sep. 13, 2021

(86) PCT No.: PCT/EP2021/075089
§ 371 (c)(1),
(2) Date: Mar. 30, 2023

(87) PCT Pub. No.: WO2022/069202
PCT Pub. Date: Apr. 7, 2022

(65) Prior Publication Data
US 2023/0368989 A1    Nov. 16, 2023

(30) Foreign Application Priority Data
Sep. 30, 2020   (DE) .................. 10 2020 212 385.3

(51) Int. Cl.
*H01H 33/02* (2006.01)
*H01H 33/56* (2006.01)

(52) U.S. Cl.
CPC ........ *H01H 33/021* (2013.01); *H01H 33/025* (2013.01); *H01H 33/56* (2013.01); *H01H 2033/566* (2013.01)

(58) Field of Classification Search
None
See application file for complete search history.

(56) References Cited

U.S. PATENT DOCUMENTS 1,349,792 A * 8/1920 Stearns .................... H01G 4/28
361/305
3,222,625 A   12/1965 Ledocq
(Continued)

FOREIGN PATENT DOCUMENTS

DE      1842865 U    12/1961
DE      2627653 A1    1/1977
(Continued)

*Primary Examiner* — Krystal Robinson
(74) *Attorney, Agent, or Firm* — Laurence A. Greenberg; Werner H. Stemer; Ralph E. Locher

(57) ABSTRACT

A high-voltage device has an encapsulation housing and at least one bushing for at least one conductor, through which a current flows, into the encapsulation housing and/or out of the encapsulation housing. At least one electrode at free potential is surrounded by the bushing. The at least one electrode at free potential increases the dielectric strength in the high-voltage device, especially in the region of the bushing.

18 Claims, 1 Drawing Sheet

(56) References Cited

U.S. PATENT DOCUMENTS

| | | | | |
|---|---|---|---|---|
| 3,814,830 | A | * 6/1974 | Cronin | H02G 15/24 |
| | | | | 174/10 |
| 4,159,401 | A | 6/1979 | Kaata | |
| 4,304,956 | A | * 12/1981 | Kishida | H01B 17/16 |
| | | | | 549/414 |
| 4,554,399 | A | 11/1985 | Cookson | |
| 4,774,385 | A | 9/1988 | Toshima | |
| 5,466,891 | A | * 11/1995 | Freeman | H01B 17/28 |
| | | | | 174/140 R |
| 2002/0134757 | A1 | * 9/2002 | Nishizumi | H02B 13/0354 |
| | | | | 218/118 |
| 2011/0011624 | A1 | * 1/2011 | Hyde | H01B 17/525 |
| | | | | 174/145 |
| 2012/0281332 | A1 | * 11/2012 | Kato | H02G 5/065 |
| | | | | 361/226 |
| 2021/0175007 | A1 | 6/2021 | Baehr et al. | |

FOREIGN PATENT DOCUMENTS

| | | |
|---|---|---|
| DE | 102017222941 A1 | 6/2019 |
| DE | 102018205705 A1 | 10/2019 |
| GB | 1544485 A | 4/1979 |
| JP | S5671007 U | 6/1981 |
| WO | WO 2010111808 A1 | 10/2010 |

* cited by examiner

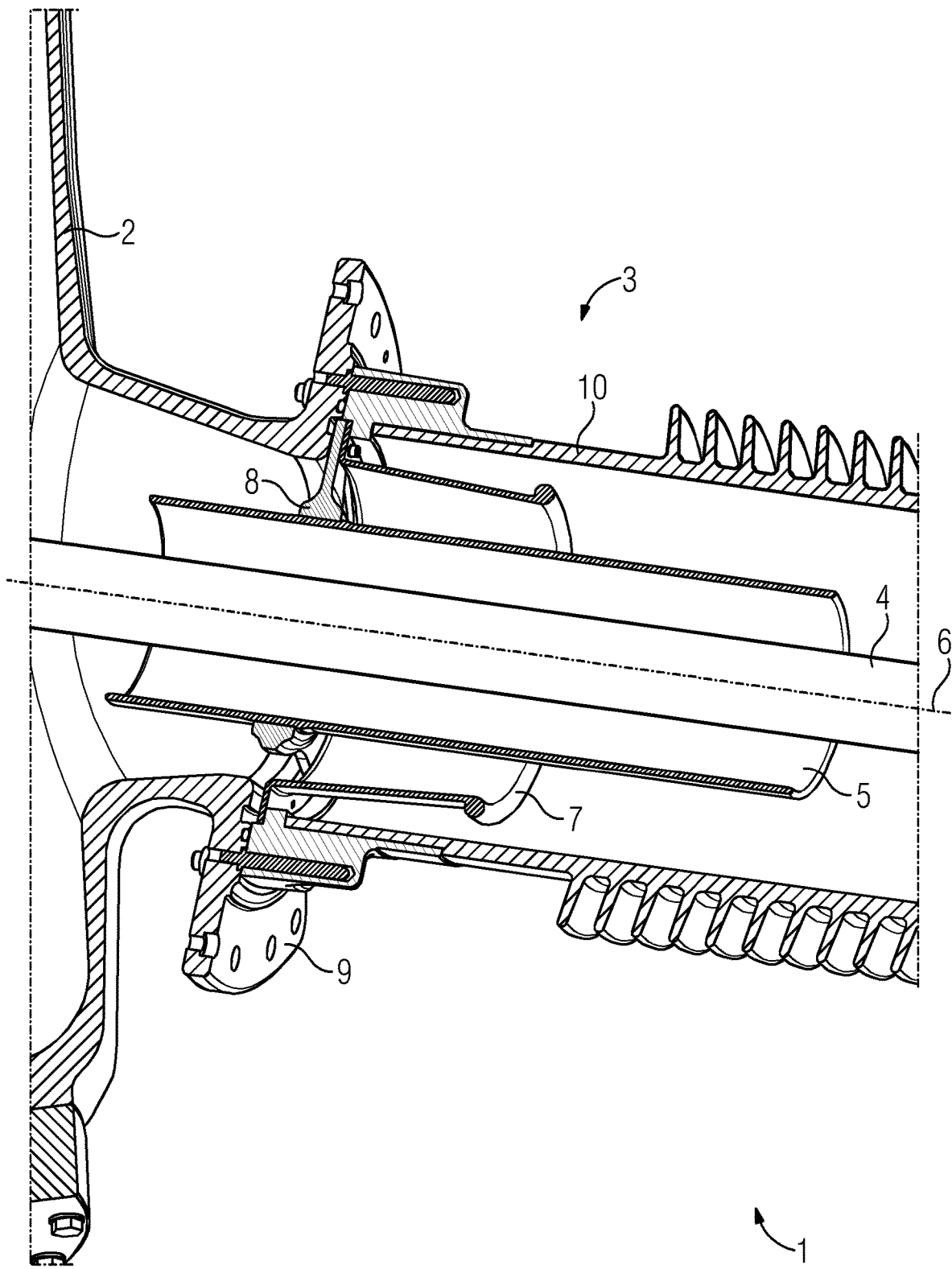

HIGH-VOLTAGE DEVICE AND METHOD FOR INCREASING THE DIELECTRIC STRENGTH IN THE HIGH-VOLTAGE DEVICE

SPECIFICATION

FIELD AND BACKGROUND OF THE INVENTION

The invention relates to a high-voltage device and a method for increasing the dielectric strength in the high-voltage device, wherein the high-voltage device includes an encapsulation housing and at least one bushing, for at least one live conductor into the encapsulation housing and/or out of the encapsulation housing.

High-voltage devices are designed for voltages in a two-figure kilovolt range up to a voltage range of several hundred kilovolts, in particular 1200 kV, and for currents in the range of up to several hundred kiloamps. High-voltage devices comprise, for example, high-voltage circuit breakers, isolators, transformers, arrestors, measurement transducers, and/or bushings. High-voltage devices, in particular power switches, are designed, for example, as outdoor and/or as gas-insulated circuit breakers, i.e., gas-insulated switch gears, which are designed as live tank, i.e., at a high voltage potential, having a switching unit arranged in an insulator, or as dead tank, i.e., having a switching unit arranged in a grounded housing.

Dead tank gas-insulated circuit breakers include an encapsulation housing, for example made of aluminum, which is designed in particular in the form of a cylindrical vessel, and bushings for live conductors, in order to connect switching units which are arranged in the interior of the encapsulation housing to power consumers, power generators, and/or power lines of a power grid. The encapsulation housing, in particular in vessel form, is designed to be gas-tight, having two openings, for example, which are circular in particular, and which are designed in the form of flanges, to which in particular hollow-cylindrical insulator housings are fastened in a gas-tight manner. The live conductors extend in the insulator housings or insulators, starting from outer terminal lugs at an end of the insulators closed gas-tight, to the openings in the encapsulation housing and through to, for example, the switching unit, to electrically connect the switching unit to power consumers, power generators, and/or power lines of the power grid.

The encapsulation housing of the high-voltage device, in particular the circuit breaker, is arranged on a carrier, for example on steel struts, which are anchored in a mechanically stable manner in particular in a concrete foundation. The encapsulation housing is electrically grounded in order to minimize hazards for maintenance personnel and/or persons in the surroundings. Insulators, in particular in oblong hollow cylinder form, are arranged or fastened on one side of the encapsulation housing, which is opposite to the side of the carrier, and point, for example, perpendicularly or at an angle away from the encapsulation housing, in particular upward away from the encapsulation housing. A sufficient electrically insulating distance of the terminal lugs from the ground potential and/or foundation is thus provided to prevent electrical flashovers. In the interior, the encapsulation housing and the insulators are filled with an insulating and/or switching gas, in particular $SF_6$.

The insulating gas insulates, for example, the switching unit and the live conductors in the interior of the high-voltage device in relation to the grounded encapsulation housing. In the area of the bushings, in particular the transitions from the circular openings in the encapsulation housing, which are designed in the form of flanges, to the fastened, in particular hollow-cylindrical insulators, a sufficient dielectric strength is to be ensured between the grounded encapsulation housing and the live conductors, in particular at high voltage potential. In the case of circular openings in the encapsulation housing, the electrical or live conductors are arranged equidistantly to the encapsulation housing, in particular perpendicularly penetrating the circle plane of the openings in the circle center point. The openings have a size or a circumference which, depending on the maximum voltage of the high-voltage device and the insulating gas used and its pressure, ensures sufficient dielectric strength to reliably prevent electrical flashovers between the conductor and the encapsulation housing.

Electrical fields or field spikes in the area of the openings are changed or reduced, i.e., shielded by grounded electrodes, in particular circular, hollow cylindrical metal electrodes arranged in the interior of the insulator and mechanically fastened on the flange of the encapsulation housing, originating from the live conductor. High voltages of the high-voltage device are thus possible, in particular in the range of several hundred kilovolts, without electrical flashovers and/or short-circuits between electrical or live conductors at high voltage potential in the high-voltage device, in particular in the area of the bushings, and the grounded encapsulation housing. High-voltage levels of the high-voltage device require, for continuous, safe operation, large diameters of the openings in the encapsulation housing, which is linked to high costs for insulators having large circumference, require switching gases having high dielectric strength, in particular $SF_6$, and/or high pressures of the switching gases, which is linked to high costs for large wall thicknesses of the insulators and encapsulation housing, in order to permanently ensure sufficient mechanical stability.

Switching gases such as $SF_6$ are harmful to the climate. Alternative switching gases, such as clean air, i.e., purified air, have a lower dielectric strength. The use of climate-friendly switching gases, such as clean air, thus requires larger opening diameters of the openings in the encapsulation housing and/or higher pressures of the switching gas, with the above-described disadvantages. Measures, such as the use of grounded control electrodes, and/or of insulating paints on conductors and/or flanges of the encapsulation housing increase the dielectric strength only to an extent that is inadequate for certain voltage levels. The use of the high-voltage circuit breakers is thus restricted.

SUMMARY OF THE INVENTION

The object of the present invention is to specify a high-voltage device and a method for increasing the dielectric strength in a high-voltage device which solve the above-described problems. In particular, it is an object to specify a high-voltage device which enables high voltage levels in a cost-effective and material-saving manner, in particular upon use of alternative switching gases such as clean air, with high dielectric strength in the area of bushings of the high-voltage device, in particular upon use of switching gases having low gas pressures, for example in the range of the ambient air, and/or with diameters of the bushings in the order of magnitude of bushings in high-voltage devices filled with $SF_6$ or smaller.

The specified object is achieved according to the invention by a high-voltage device having the features according to claim and/or by a method for increasing the dielectric strength in a high-voltage device, in particular an above-described high-voltage device, according to claim. Advantageous embodiments of the high-voltage device according to the invention and/or the method according to the invention for increasing the dielectric strength in a high-voltage device, in particular in an above-described high-voltage device, are specified in the dependent claims. The subjects of the main claims can be combined with one another and with features of dependent claims, and features of the dependent claims can be combined with one another.

A high-voltage device according to the invention comprises an encapsulation housing and at least one bushing for at least one live or electrical conductor. The synonym live conductor is used hereinafter for electrical conductor in order to describe the effect of the invention in particular when current flows in the conductor. The at least one conductor leads into the encapsulation housing and/or out of the encapsulation housing. At least one electrode at free potential is comprised by the bushing.

The at least one electrode at free potential enables the use of bushings having small diameter, in particular upon the use of climate-friendly switching gases, such as clean air, as an alternative to climate-damaging switching gases, such as $SF_6$. The high-voltage device having at least one electrode at free potential is therefore cost-effective and material saving, in particular due to the possibility of using bushings having small diameter, in particular upon the use of climate-friendly switching gases such as clean air, and enables the use of switching gases at low gas pressures, for example in the range of the ambient air, which permits encapsulation housings and insulators having low wall thicknesses, at high voltage levels, with high dielectric strength in the area of the bushings of the high-voltage device.

At least one switching unit of a high-voltage circuit breaker can be comprised by the high-voltage device, in particular arranged in the encapsulation housing and/or connected via the at least one live conductor to power consumers, power generators, and/or lines of a power grid. Switching units of high-voltage circuit breakers are installed in encapsulation housings of the above-described type, having at least one bushing for at least one live or electrical conductor, to which the above-described advantages are connected in particular for the high-voltage circuit breakers as high-voltage devices.

The at least one electrode at free potential can be cylindrical. A cylindrical electrode, in particular having circular cross section, is simple and cost-effective and can be arranged equidistantly around the live or electrical conductor.

The at least one electrode at free potential can be arranged congruently to a center axis or identically to a longitudinal axis of the at least one live conductor. Optimal shielding of electrical fields of the bushing is thus provided, in particular in the area of the openings in the encapsulation housing.

At least one electrode at ground potential can be comprised by the bushing, in particular spatially comprised. The at least one electrode at ground potential can be arranged spaced apart from the at least one electrode at free potential. The at least one electrode at ground potential can at least partially spatially enclose the at least one electrode at free potential. A further shielding of electrical fields in the area of the openings in the encapsulation housing is thus provided, in particular a good shielding of the openings in relation to the live conductor. The combination of an electrode at ground potential with an electrode at free potential results in a high dielectric strength in the area of the bushings and/or in the area of the openings in the encapsulation housing, with the above-described advantages. The combination additionally increases the shielding in relation to a use of only one electrode or one electrode type. The arrangement of the at least one electrode at ground potential around the at least one electrode at free potential enables a grounded arrangement or fastening of the electrode at ground potential on the encapsulation housing or on the flange of the encapsulation housing around the openings.

The at least one electrode at free potential can be arranged congruently to a center axis or identically to the center axis of the at least one electrode at ground potential. The at least one electrode at free potential can be formed longer along the center axis than the at least one electrode at ground potential. Optimum shielding of the openings in the encapsulation housing in relation to the electrical or live conductors is thus provided, with the above-described advantages.

The at least one electrode at free potential can be mounted by an electrically insulating spacer, in particular made of ceramic, plastic, silicone, PTFE, Teflon, epoxy resin, and/or a composite material, in particular equidistantly to the at least one live conductor, in particular on the encapsulation housing. The electrically insulating spacer ensures that the at least one electrode at free potential is not grounded and is at free potential, and optimum shielding thus results, in particular with equidistant arrangement to the at least one live conductor. Materials such as ceramic, plastic, silicone, PTFE, Teflon, epoxy resin, and/or a composite material have a good electrically insulating effect and are cost-effective, mechanically stable, and enable a mechanically permanently stable mounting of the at least one electrode at free potential, in particular on the encapsulation housing, equidistantly to the at least one live conductor.

The encapsulation housing can include a flange and an insulator, in particular a hollow-tubular and/or circular-cylindrical insulator, in particular having ribs on the outer circumference, can be fastened in a mechanically stable manner on the flange. A flange enables a mechanically stable, permanently strong, and in particular gas-tight fastening of an insulator on the encapsulation housing. A gas-tight housing of the high-voltage device having encapsulation housing and insulators is thus possible, which includes at least partially electrically shielded conductors in the housing. The electrodes, in particular arranged in the insulator and/or encapsulation housing are, for example, protected from weather influences.

The insulator can be arranged congruently with a center axis or identically to a center axis of the at least one electrode at free potential and/or the longitudinal axis of the at least one live conductor. This results in a space-saving, cost-effective arrangement, having good shielding effect of the electrode.

The at least one electrode at free potential can protrude into the encapsulation housing and/or protrude into the insulator. Guiding the electrode at free potential into the encapsulation housing and into the insulator, through the opening, results in a high shielding effect of the opening in the encapsulation housing by the electrode at free potential, having the above-described advantages.

The at least one electrode at free potential can be constructed or consist of a metal, in particular copper, aluminum, and/or steel, and/or of a metallic alloy. Metals result in good electrical shielding effects, are cost-effective, and are easily producible in arbitrary shape or are easily processable.

The high-voltage device, in particular the encapsulation housing and/or the bushing, can be filled using clean air. Clean air is cost-effective and environmentally friendly, in particular climate neutral. A lower dielectric strength of clean air in relation to conventional insulating gases such as $SF_6$ can be compensated for by the use of the at least one electrode at free potential in particular in the area of openings in the encapsulation housing with live or electrical conductors led through. A use of identical encapsulation housings for different insulating gases is thus possible, which enables a simple exchange in existing high-voltage devices, upon installation of electrodes at free potential, with climate-friendly effects, and cost-effective high piece counts in neutral facilities, in particular upon the use of climate-friendly insulating gases. Encapsulation housings and insulators having small dimensions can be used, which saves material and costs, with the above-described advantages.

A method according to the invention for increasing the dielectric strength in a high-voltage device, in particular in an above-described high-voltage device, comprises that at least one electrode at free potential, comprised by at least one bushing for at least one live conductor, leading into an encapsulation housing of the high-voltage device and/or leading out of the encapsulation housing, increases the dielectric strength in relation to a bushing without electrode at free potential.

The advantages of the method according to the invention for increasing the dielectric strength in a high-voltage device, in particular in an above- described high-voltage device, according to claim are analogous to the above-described advantages of the high-voltage device according to the invention according to claim and vice versa.

An exemplary embodiment of the invention is schematically shown in the single FIGURE below and described in more detail hereinafter.

BRIEF DESCRIPTION OF THE FIGURE

FIGURE schematically shows a sectional view of a detail of a high-voltage device 1 according to the invention, having an opening in an encapsulation housing 2, and having a bushing 3 for a live conductor 4 through the opening, wherein an electrode 5 at free potential is comprised by the bushing 3.

DETAILED DESCRIPTION OF THE INVENTION

The figure schematically shows a sectional view of a detail from a high-voltage device 1 according to the invention, having an opening in an encapsulation housing 2 of the high-voltage device 1. The opening comprises a flange 9, which is in the form of a ring or rim. Boreholes for fastening means, for example screws, are formed in the flange 9. A hollow-tubular insulator 10 is arranged standing perpendicularly on the flange 9, and is fastened via the fastening means, in particular screws, in a mechanically stable manner on the flange 9. The encapsulation housing 2 having flange 9 is formed, for example, from a metal, in particular aluminum. The insulator 9 is, for example, made of ceramic, silicone, and/or composite materials. In particular rim-shaped ribs for extending leakage current paths are formed on the outer circumference of the insulator 10.

The hollow-tubular insulator 10, having circular cross section, has a longitudinal axis 6 which stands perpendicularly on the opening plane of the circular opening, and intersects or penetrates the opening in the encapsulation housing 2 in the circle center point. A switching unit of a high-voltage circuit breaker, comprised by the high-voltage device 1 according to the invention, is arranged, for example, in the encapsulation housing 2 and electrically connected via conductor 4 to power consumers, power generators, and/or power lines of a power grid outside encapsulation housing 2. An electrical conductor 4, which is a live conductor 4 in operation of the high-voltage device 1 or in the closed state of the switching unit and is generally referred to below as a live conductor 4 for all switch positions or states of high-voltage devices in order to express its effect with respect to the opening and electrodes, is in particular in the form of a rod or bar, having a longitudinal axis implied by or identical with the longitudinal axis 6 of the insulator. The live conductor 4 is made, for example, of copper, aluminum, and/or conductive steel.

When current flows through the live conductor 4, there is an electrical and magnetic field around the conductor 4. The conductor 4 is at high voltage potential, in particular up to 1200 kV, and the encapsulation housing 2 is grounded, i.e., at ground potential. The potential difference between grounded encapsulation housing 2 and live conductor 4 can result in voltage flashovers and/or short-circuits. To prevent this, the opening in the encapsulation housing 2 has a sufficient radius, which ensures a minimum distance between conductor 4 and encapsulation housing 4, which is sufficiently large to prevent voltage flashovers. The required minimum distance is dependent on the insulating gas, using which the encapsulation housing 4 and the insulator 10 are filled, for example clean air, and on the pressure of the insulating gas, for example 1 bar. Further measures, such as an insulating paint on the conductor 4 and/or the interior of the encapsulation housing 4, can enable reductions of the minimum distance.

One possibility for reducing the minimum distance, with sufficient dielectric strength in the area of the opening in the encapsulation housing 4, is the use of an electrode 7 at ground potential, as shown in the FIGURE. The electrode 7 is made of a metal, in particular aluminum, copper, and/or steel, is in the form of a hollow cylinder or hollow tube, having circular cross section. The hollow-tubular electrode 7, having circular cross section, has a longitudinal or center axis 6 which stands perpendicularly on the opening plane of the circular opening and intersects or penetrates the opening in the encapsulation housing 2 in the circle center point. The longitudinal or center axis of the electrode 7 at ground potential is implied by or identical with the longitudinal axis 6 of the insulator 10. The electrode 7 is fastened in a mechanically stable and electrically conductive manner using fastening means, for example screws, on the flange 9 of the encapsulation housing 2 and protrudes into the insulator 10. The electrode 7 changes the electrical field between encapsulation housing 2 and live conductor 4 in such a way that voltage flashovers at the opening of the encapsulation housing 2 or the flange 9 are shielded by the electrode 7 or are displaced into the interior of the insulator 10.

According to the invention, a further shielding of the electrical field or change of the field between encapsulation housing 2 and live conductor 4 is possible by using an electrode 5 at free potential. The electrode 5 is made of a metal, in particular aluminum, copper, and/or steel, in the form of a hollow cylinder or hollow tube, having circular cross section. The cross section is smaller than the cross section of the electrode 7. The hollow-tubular electrode 5 having circular cross section has a longitudinal or center axis 6, which stands perpendicularly on the opening plane of the circular opening and intersects or penetrates the opening in the encapsulation housing 2 in the circle center point. The longitudinal or center axis of the electrode 5 at free potential implies or is identical with the longitudinal axis 6 of the insulator 10 and the center axis of the electrode 7 at ground potential.

The electrode 5 is fastened via a spacer 8 on the flange 9 of the encapsulation housing 2 in a mechanically stable and electrically insulated manner, and protrudes both into the insulator 10 and also into the encapsulation housing 2. The electrode 5 protrudes further into the insulator 10 than the electrode 7 and shields the electrode 7 at ground potential in relation to the live conductor 4. The spacer 8 is made of an electrically insulating material, in particular of ceramic, plastic, silicone, PTFE, Teflon, epoxy resin, and/or a composite material. The spacer fixes the electrode 5 at free potential in particular equidistantly to the live conductor 4 and to the encapsulation housing 2, i.e., to the flange 9.

The electrode 5 at free potential changes the electrical field between encapsulation housing 2 and live conductor 4 in such a way that voltage elevations at the opening of the encapsulation housing 2 or the flange 9 and at the electrode 7 at ground potential are shielded by the electrode 5 at free potential or are displaced in attenuated form further into the interior of the insulator 10 and into the encapsulation housing 2. Voltage flashovers and/or short-circuits between the encapsulation housing 2 and the live conductor 4 are thus prevented, even with reduced size of the opening of the encapsulation housing 2 or the flange 9, low insulating gas pressures, upon use of alternative insulating gases such as clean air, and/or increased voltage levels in operation of the high-voltage device 1.

Material savings and lower costs for materials with smaller sizes and wall thicknesses of encapsulation housings 2 and insulators 10 are linked thereto, lower weight with increased dielectric strength in the area of the bushing 3 of the live conductor 4 through the opening in the encapsulation housing 2, and the use of alternative switching gases is possible, such as clean air, at low pressures, for example, 1 bar. The reliability and service life of the high-voltage device 1 are increased and maintenance expenditure is reduced.

The above-described exemplary embodiments can be combined with one another and/or can be combined with the prior art. Thus, for example, high-voltage devices 1 can comprise high-voltage circuit breakers, isolators, transformers, arrestors, measurement transducers, and/or bushings. High-voltage devices, in particular circuit breakers, are, for example, designed as gas-insulated circuit breakers, i.e., gas-insulated switch gears. The basic principle, having an electrode at free potential in a bushing of conductors through openings at ground potential, is also usable in open air circuit breakers or open air high-voltage devices. The invention is usable in dead tank facilities, i.e., with a switching unit arranged in a grounded housing. However, the basic principles are also usable in live tank facilities, i.e., with a switching unit at high voltage potential arranged in an insulator. The electrode 5 at free potential is made, for example, hollow cylindrical. Further shapes, for example having elliptical cross section and/or formed as a truncated cone, are also possible.

The encapsulation housing 2 of the high-voltage device is, for example, in the form of a vessel, and is closed gas-tight via the insulators 10. Vessels are, for example, spherical or cylindrical, further shapes are also possible. Connections between elements of the high-voltage device are carried out, for example, in a mechanically stable manner via fastening means, in particular screws, and at least one flange. Further or alternative connection technologies, in particular adhesive bonds, welded bonds, and/or soldered bonds, are also applicable. The use of seals for the gas-tight connection of elements, in particular copper seals, is possible. The spacer is, for example, disc-shaped in one piece. Alternatively, multipart spacers having identical or different partial shapes are usable. Electrode ends are rounded, for example, to avoid field elevations. Further shapes of the electrode ends, for example extending linearly, angled, rounded having different rounding radii, are possible.

LIST OF REFERENCE NUMERALS 1 high-voltage device
2 encapsulation housing
3 bushing
4 live conductor
5 electrode at free potential
6 longitudinal or center axis
7 electrode at ground potential
8 spacer
9 flange
10 insulator

The invention claimed is:

1. A high-voltage device, comprising:
an encapsulation housing;
at least one bushing for guiding at least one live conductor into said encapsulation housing and/or out of said encapsulation housing; and
at least one electrode at free potential enclosed by said at least one bushing; and
said encapsulation housing having a flange and an insulator fastened in a mechanically stable manner on said flange, and said at least one electrode at free potential projects into said encapsulation housing.

2. The high-voltage device according to claim 1, comprising at least one switching unit of a high-voltage circuit breaker.

3. The high-voltage device according to claim 2, wherein said at least one switching unit is arranged in said encapsulation housing and/or is connected via said at least one live conductor to power consumers, power generators, and/or lines of a power grid.

4. The high-voltage device according to claim 1, wherein said at least one electrode at free potential is cylindrical in shape.

5. The high-voltage device according to claim 1, wherein said at least one electrode at free potential has a center axis that is congruent with a longitudinal axis of said at least one live conductor.

6. The high-voltage device according to claim 1, further comprising at least one electrode at ground potential in said bushing.

7. The high-voltage device according to claim 6, wherein said at least one electrode at ground potential is spaced apart from said at least one electrode at free potential and encloses, at least partially, said at least one electrode at free potential.

8. The high-voltage device according to claim 6, wherein said at least one electrode at free potential has center axis that is congruent with a center axis of said at least one electrode at ground potential, and/or wherein said at least one electrode at free potential is formed longer along the center axis than said at least one electrode at ground potential.

9. The high-voltage device according to claim 1, which further comprises an electrically insulating spacer mounting said at least one electrode at free potential on said encapsulation housing.

10. The high-voltage device according to claim 9, wherein said electrically insulating spacer is configured to mount said at least one electrode at free potential equidistant to said at least one live conductor.

11. The high-voltage device according to claim 9, wherein said electrically insulating spacer is made of a material selected from the group consisting of ceramic, plastic, silicone, polytetrafluoroethylene (PTFE), Teflon®, epoxy resin, and a composite material.

12. The high-voltage device according to claim 1, wherein said insulator is a hollow-tubular and/or circular-cylindrical insulator formed with ribs on an outer circumference thereof.

13. The high-voltage device according to claim 1, wherein a center axis of said insulator is coaxial with a center axis of said at least one electrode at free potential and/or with a longitudinal axis of said at least one live conductor.

14. The high-voltage device according to claim 1, wherein said at least one electrode at free potential projects into said insulator.

15. The high-voltage device according to claim 1, wherein said at least one electrode at free potential consists of a metal or a metallic alloy.

16. The high-voltage device according to claim 15, wherein said metal is at least one metal selected from the group consisting of copper, aluminum, and steel.

17. The high-voltage device according to claim 1, wherein at least one of said encapsulation housing or said bushing is filled with clean air.

18. A method for increasing a dielectric strength in a high-voltage device, the method comprising:
   providing the high-voltage device with
      an encapsulation housing having a flange and an insulator fastened in a mechanically stable manner on the flange, and
      at least one bushing for guiding at least one live conductor into the encapsulation housing and/or out of the encapsulation housing;
   providing at least one electrode at free potential inside the at least one bushing
   wherein the at least one electrode at free potential projects into the encapsulation housing, and wherein the at least one electrode is disposed to increase the dielectric strength relative to a bushing without an electrode at free potential.

* * * * *